(12) United States Patent
Theismann et al.

(10) Patent No.: US 6,419,494 B1
(45) Date of Patent: Jul. 16, 2002

(54) ERROR FEEDBACK SYSTEM AND METHOD FOR CORRECTING HABITUAL KEYBOARDING ERRORS

(76) Inventors: Betty J. Theismann; John C. Theismann, both of 5523 Pennsylvania Ave., St. Louis, MO (US) 63111

( * ) Notice: Subject to any disclaimer, the term of this patent is extended or adjusted under 35 U.S.C. 154(b) by 39 days.

(21) Appl. No.: 09/597,385

(22) Filed: Jun. 19, 2000

(51) Int. Cl.⁷ .............................................. G09B 13/00
(52) U.S. Cl. ..................... 434/227; 434/233; 400/493; 400/483
(58) Field of Search .................... 70/460, 454; 345/168, 345/169; 434/227–233; 493/961; 400/482, 483, 487, 485, 494, 491.3, 495, 493

(56) References Cited

U.S. PATENT DOCUMENTS

| 1,816,642 A | 7/1931 | Fetter | |
| 1,823,130 A | 9/1931 | Smith | |
| 2,632,266 A | 3/1953 | Sellwood | 40/2 |
| 2,802,284 A * | 8/1957 | Dreisonstok et al. | 35/6 |
| 3,501,849 A * | 3/1970 | Olsen | 434/227 |
| 3,894,346 A | 7/1975 | Ward et al. | 35/8 |
| 4,055,905 A | 11/1977 | Budrose | 35/5 |
| 4,208,983 A | 6/1980 | Buckley | 116/205 |
| 4,317,852 A * | 3/1982 | Ogden | 428/40 |
| 4,385,586 A | 5/1983 | Schriever | 116/205 |
| 4,902,231 A * | 2/1990 | Freer | 434/227 |
| 4,909,739 A | 3/1990 | Ladner et al. | 434/233 |
| 4,913,981 A | 4/1990 | Hynes et al. | 429/1 |
| 5,309,863 A | 5/1994 | Leeb, Jr. | 116/205 |
| 5,314,337 A | 5/1994 | Dixon | 434/227 |
| 5,391,078 A * | 2/1995 | Murphy | 434/113 |
| 5,515,763 A | 5/1996 | Vandervoot | 84/433 |

* cited by examiner

Primary Examiner—Derris H. Banks
Assistant Examiner—Dmitry Suhol
(74) Attorney, Agent, or Firm—Grace J. Fishel

(57) ABSTRACT

An error feedback system for use in correcting habitual keyboarding errors makes use of a set of markers for the keys that are mis-keyed. Each marker has an indicating side which can be identified by a user by feel and an adhering side which allows the marker to be adhered to the top surface of the key. The indicating side provides immediate feedback about a keyboarding error so that the error is not reinforced and repeat errors are minimized.

4 Claims, 3 Drawing Sheets

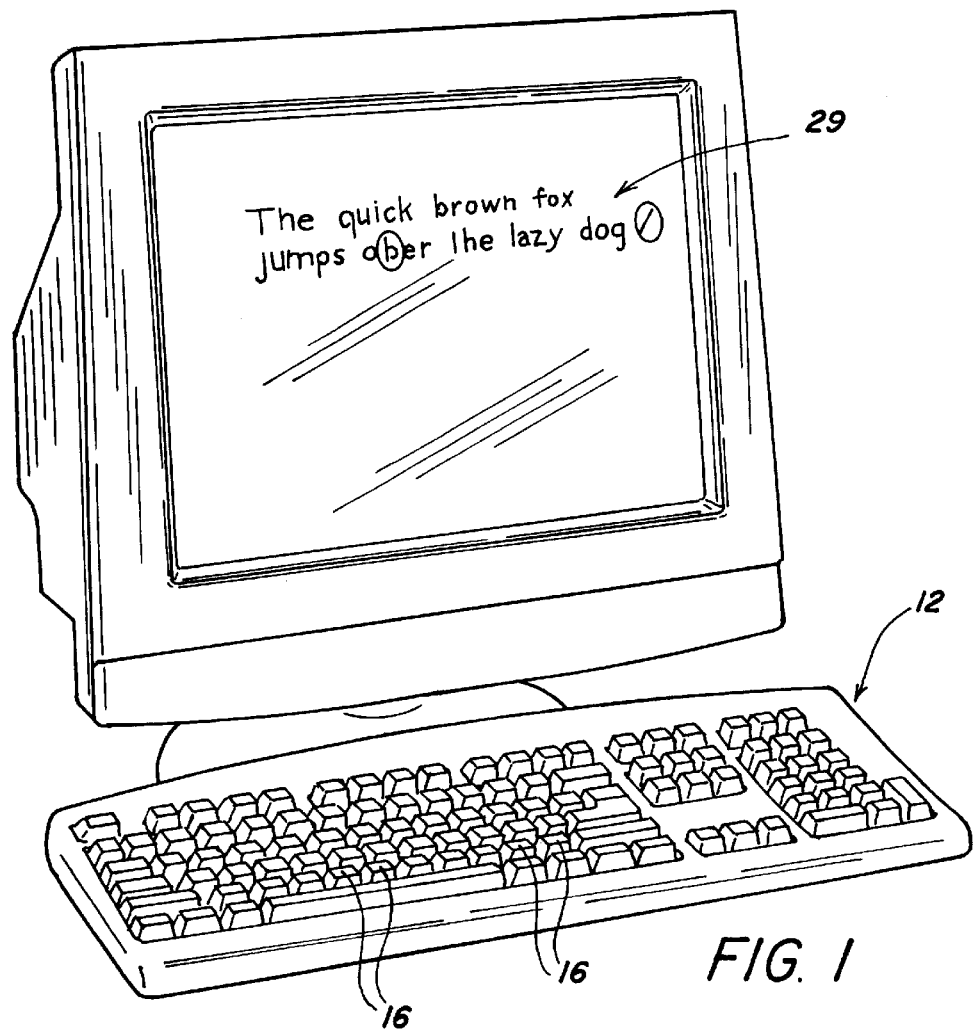
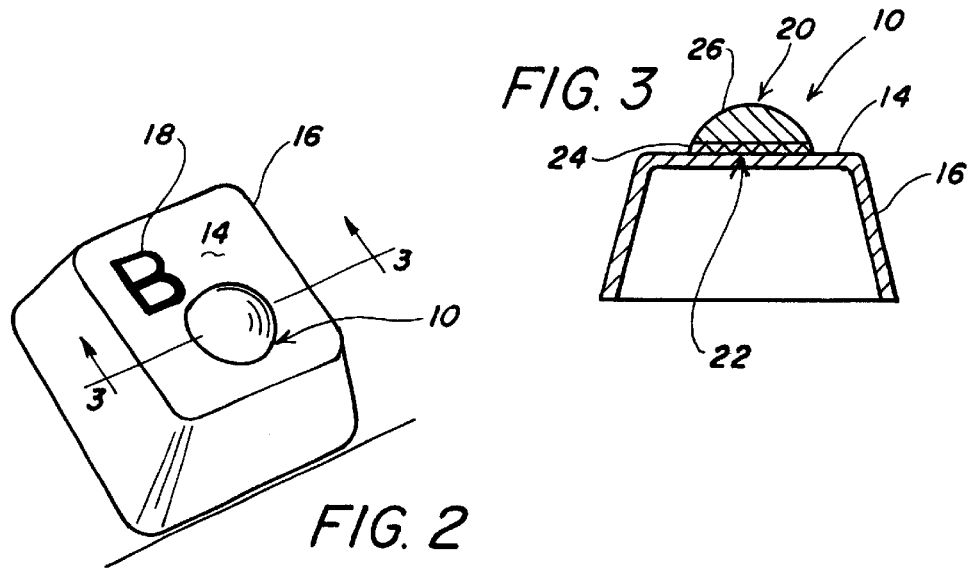

ERROR FEEDBACK SYSTEM AND METHOD FOR CORRECTING HABITUAL KEYBOARDING ERRORS

BACKGROUND OF THE INVENTION

1. Field of the Invention

The present invention relates to an error feedback system for correcting habitual keyboarding errors.

2. Brief Description of the Prior Art

A user's true keyboarding speed depends to some extent on how many typing errors are made. Even with a spell-checker, it takes time to correct errors. Other keyboarding errors, such as entering financial data into an adding machine or entering orders on a keypad at a fast food restaurant, must be caught by the user, as there is no "spell-checker" backup. Mistakes affect the effective speed at which the user delivers services.

Many users have keyboard typing patterns that include a habitual mis-keying of certain characters. Once these habits have been established it is difficult to overcome them because they are continually being practiced. For a user to be re-educated, he or she must be made aware that the error is occurring, as it occurs, preferably without breaking typing speed.

There are special keyboarding devices that lock the key, sound an alarm, flash a light, etc. when a keyboarding error occurs. While these machines may be useful in teaching typing, they are not practical in the workplace for correcting habitual keyboarding errors of a user who already knows where the keys are. It is to this problem that the present invention is addressed.

BRIEF SUMMARY OF THE INVENTION

In view of the above, it is an object of the present invention to provide a error feedback system that can be used for correcting habitual keyboarding errors in the course of ordinary work on a keyboard. It is another object to provide a system that provides immediate feedback about a keyboarding error as it occurs such that the error is not reinforced. Other objects and features of the invention will be in part apparent and in part pointed out hereinafter.

In accordance with the invention, an error feedback system for use in correcting a habitual keyboarding error is implemented with a set of markers. The markers are adapted to be adhered to the top of a key on a keyboard in a manner as not to cover the key symbol on the key. Each marker has an indicating side and an adhering side with an adhesive on the adhering side of each marker adapted to allow the marker to be adhered to the top surface of the key. A raised indicium is provided on the indicating side of each marker that can be tactually identified by the user.

In use for correcting a user's habitual keyboarding error, a user identifies a key that is he or she habitually mis-keys. The user then selects a marker from the set of markers and applies the marker to the key that is habitually mis-keyed in a manner as not to cover the key symbol on the key. As the user keyboards data, he or she tactually identifies the key if the key is mis-keyed by sensing the marker. This provides the user with immediate feedback about the keyboarding error so that the mis-keying habit can be broken and repeat errors are minimized.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention is illustrated, corresponding reference characters refer to corresponding parts throughout the several views of the drawings in which:

FIG. 1 is a perspective view of a keyboard and a video terminal upon which is displayed the pangram "The quick brown fox jumps over the lazy dog." with two typing errors;

FIG. 2 is a perspective view of a key with a marker for correcting habitual keyboarding errors such as illustrated in FIG. 1;

FIG. 3 is a section taken along line 3—3 in FIG. 2;

DETAILED DESCRIPTION OF THE INVENTION

Figure 4A:
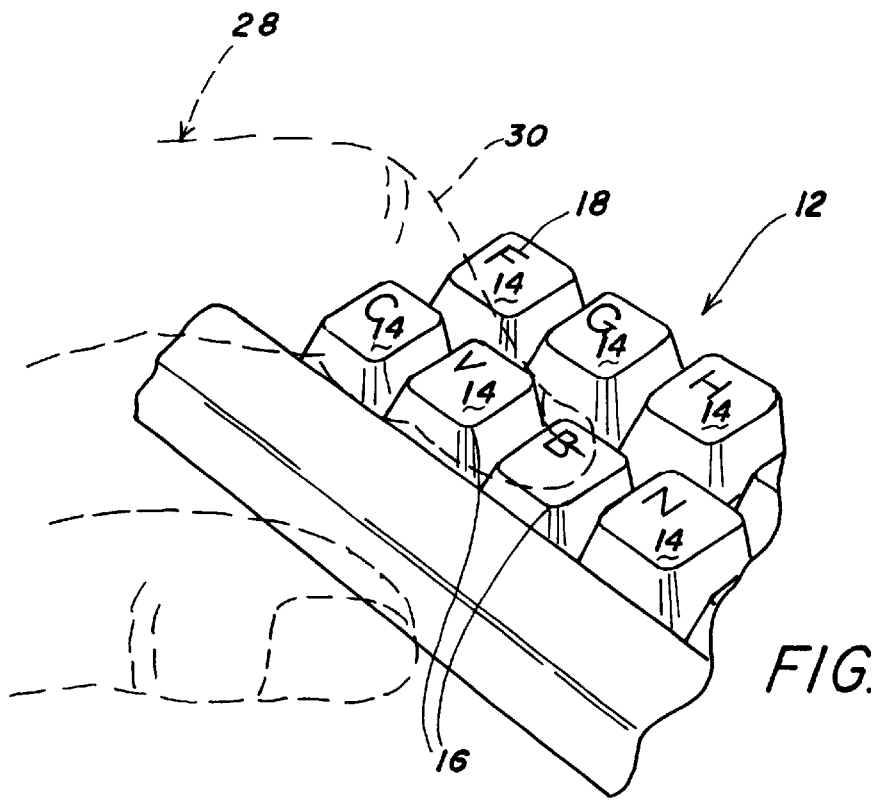
FIG. 4A is a perspective view of a portion of a keyboard showing the letter "B" being mis-keyed for the letter "V"
Figure 4B:
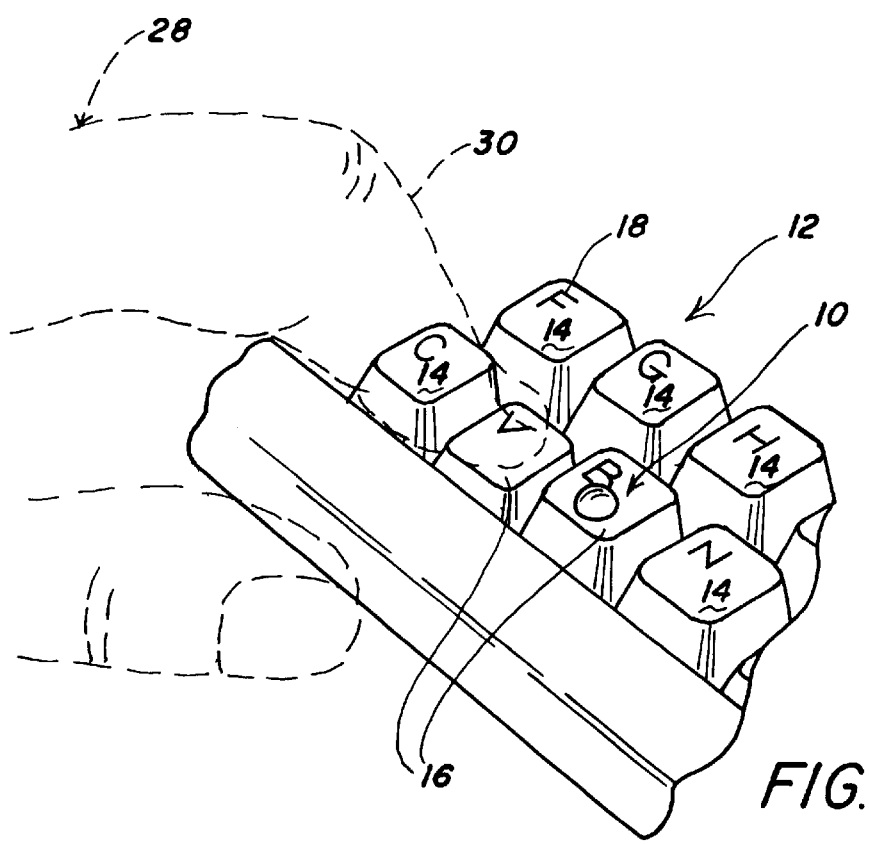
FIG. 4B is a perspective view of a portion of a keyboard with a marker for correcting habitual keyboarding errors applied to the key with the letter "B" and showing the letter "V" being properly keyed.

Referring to the drawings more particularly by reference character, reference number 10 refers to a marker, a plurality of which are provided as a set, for use in a system for correcting habitual keyboarding errors. As more particularly described hereinafter, marker 10 can be used on any multiple finger-operated keyboard 12 for data entry into computer terminals, calculating machines, stenography machines, number keypads, item keypads, etc.

Markers 10 are adapted to be adhered to a top surface 14 of a key 16 on data entry keyboard 12 in a manner as not to cover a key symbol 18 on the key. Each marker 10 has an indicating side 20 and an adhering side 22. An adhesive layer 24 such as glue on adhering 22 side allows the marker to be applied to top surface 14 of key 16. Adhesive layer 24 may attach marker 10 permanently or in a manner that it can be readily peeled off.

A raised indicium 26 that can be tactually identified by a user 28 is provided on indicating side 20. Indicium 26 may be a hard plastic hemisphere or bump, rounded on top, as shown, to enhance fingertip comfort. Indicium 26 may take other forms such as a ridge, point, textured surface or the like so long as it facilitates tactile perception. Indicium 26, for some applications, may be colored such as with a fluorescent color or such that it glows in the dark.

Adhesive layer 24 may be provided as a double-sided adhesive tape, one side of which is permanently adhered to indicium 26. Such tape is readily available from manufacturers such as the Minnesota Mining and Manufacturing Company. A peel-off release-sheet is included to cover the exposed other side of the adhesive tape layer to preserve the tackiness of adhesive layer 24. The release-sheet is removed prior to affixing marker 10 to key 16.

The present invention is intended for use by those users who are not professional typists but who need to improve their keyboarding accuracy such as to maintain a job or for advancement. In use, a key is identified by user 28 as habitually mis-keyed. Such keys are already known to user 28 or may be identified by typing a pangram such as "The quick brown fox jumps over the lazy dog." A pangram is a short piece of text that makes sense containing all the letters of the alphabet with as few duplications as possible. Other pangrams such as "Pack my box with five dozen liquor jugs." or "How razorback-jumping frogs can level six piqued gymnasts!" may also be used.

Figure 5A:
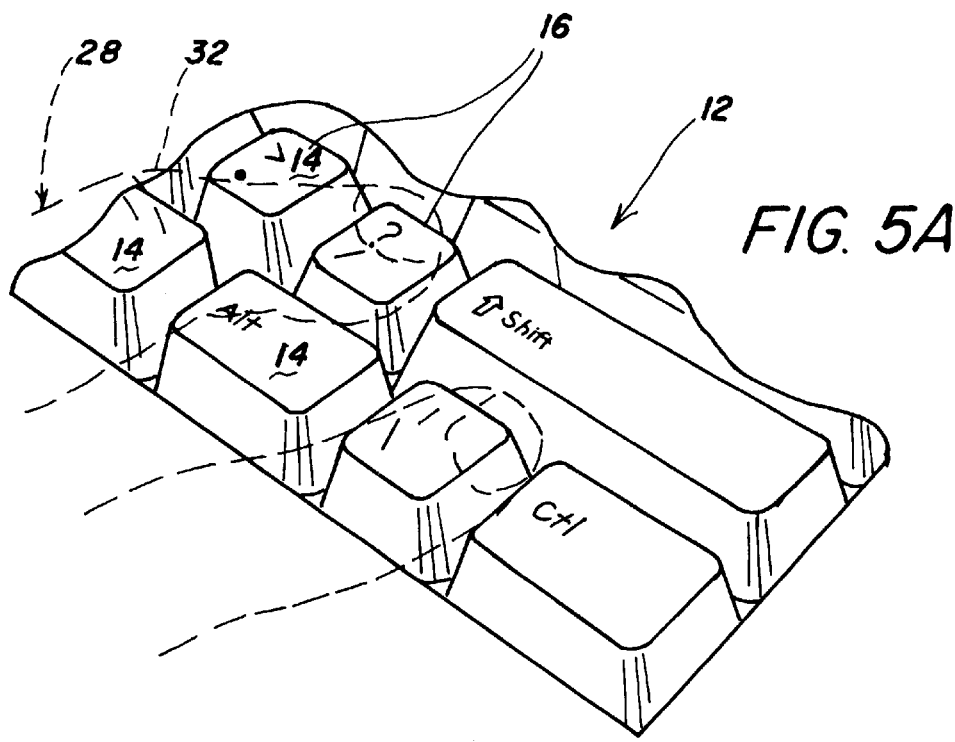
FIG. 5A is a perspective view of a portion of a keyboard showing the character "/" being mis-keyed for the character "."; and, FIG. 5B is a perspective view of a portion of a keyboard with a marker for correcting habitual keyboarding errors applied to the key with the character "/" and showing the character "." being properly keyed.
Figure 5B:
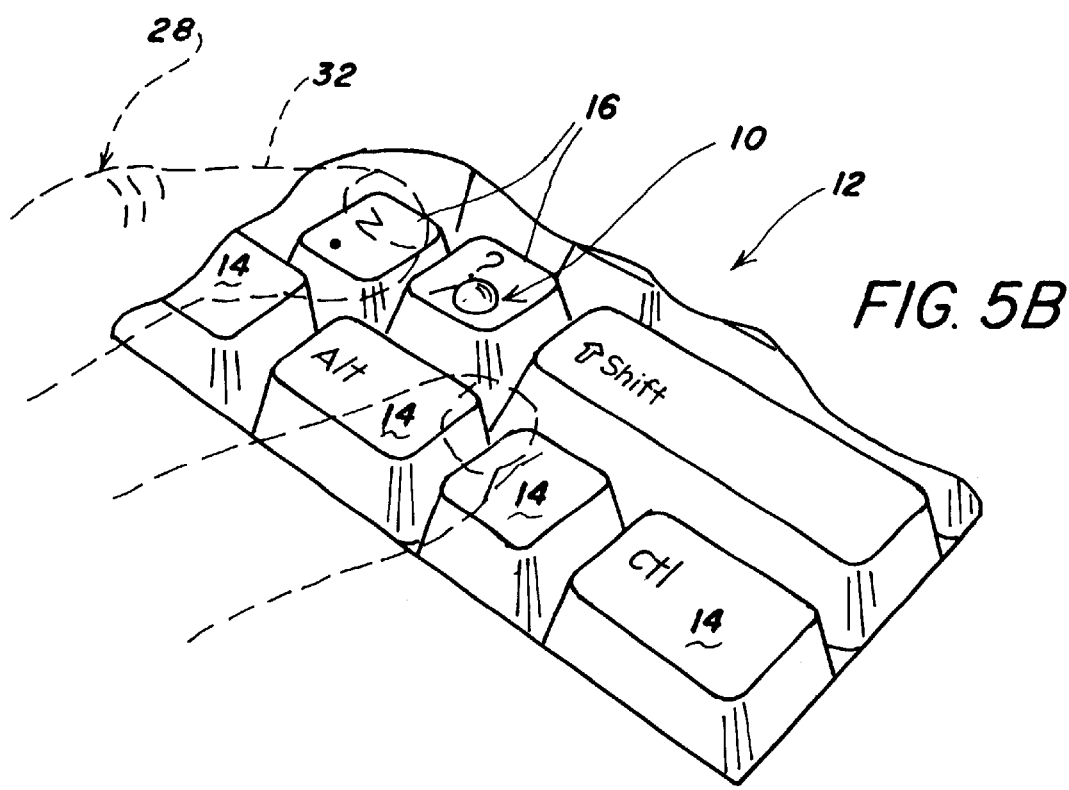

As shown in FIG. 4A and FIG. 5A, user 28 illustrated therein habitually mis-keys the letter "B" with his left index finger 30 when "V" is intended and the character "/" with his right ring finger 32 when "." is needed. The phrase "The quick brown fox jumps over the lazy dog." comes out as shown in FIG. 1 "The quick brown fox jumps ober the lazy dog/".

To correct these errors, user 28 applies marker 10 to top surface 14 of the "B" and "/" keys which in this instance are habitually mis-keyed. Marker 10 is applied to each key 16 in a manner as not to cover key symbol 18. This is important as even a professional typist occasionally looks at the keyboard for orientation in typing some of the less-used characters. Less skilled users, look at the keyboard more often.

Thereafter, as user 28 enters data, indicium 26 is tactually identified when the "B" or "/" keys are struck and user 28 is provided immediate feedback about the keyboarding error as it occurs. Each time the error is made, user 28 is cued, reinforcing the user's awareness of the key. Since the error is not reinforced, repeat errors are minimized and the habit is broken in time.

An important feature of the present system is that it does not interfere with typing speed as user 28 is not required to stop when a mistake occurs. In fact, user 28 is encouraged to keep entering data as it is more efficient to correct all errors in a separate editing operation. Any system for correcting keyboarding errors that slows user 28 would likely not be used. One advantage of the present system is that it allows user 28 to improve accuracy in the course of ordinary work on keyboard 12 without interfering with the user's ability to get his or her work done.

Instead of trying to correct every error simultaneously, it may be more effective for user 28 to re-educate his or her fingers for just one or two keys. The human brain can handle one thing at a time and even bear this single step in mind while carrying on normal work. In this way, step by step, without undue frustration, user 28 can bring each finger into correct use.

Once user 28 has overcome his habitual keyboarding error with respect to a key, marker 10 can be removed from key 16 without a trace if adhesive layer 24 is not permanent. Marker 10 can also be removed from keyboard 12 if the machine is shared by other users. This is advantageous, for example, in a fast food restaurant where an item keypad is used for data entry. In this instance, user 28 can remove markers 10 from keyboard 12 at the end of his or her service period. Since markers 10 can be made inexpensively, they may be disposed of and new ones installed at the beginning of user's next duty cycle. On the other hand, if user 28 prefers, markers 10 can be saved by reattaching them to the peel off release-sheet from which they were detached.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A method for correcting a user's habitual keyboarding error comprising (a) identifying a key that is habitually mis-keyed by a user;
  (b) providing a set of markers, each of said markers adapted to be adhered to the top of a key on a keyboard in a manner as not to cover the key symbol, each of said markers having an indicating side and an adhering side, each of said markers having an adhesive on the adhering side of each marker adapted to allow the marker to be removably adhered to the top surface of the key, and each of said markers having a raised indicium on the indicating side of each marker that can be tactually identified by the user;
  (c) selecting a marker from the set of markers;
  (d) applying said selected marker to the key that is habitually mis-keyed in a manner as not to cover the key symbol on the key; and,
  (e) tactually identifying the key if the key is mis-keyed
  whereby the user is provided immediate feedback about the keyboarding error so that the mis-keying habit can be broken and repeat errors are minimized.

2. The method of claim 1 wherein the raised indicium is a plastic hemisphere.

3. The method of claim 2 wherein the adhesive layer is a double-sided adhesive tape.

4. The method of claim 2 wherein the set of markers are provided on a release-sheet prior to being affixed to a key that is habitually mis-keyed.

\* \* \* \* \*